United States Patent [19]

Melhorn

[11] 4,143,561

[45] Mar. 13, 1979

[54] HYDROKINETIC TORQUE CONVERTER WITH LOCK-UP CLUTCH AND INTERNAL VIBRATION DAMPING

[75] Inventor: Barry J. Melhorn, Westland, Mich.

[73] Assignee: Ford Motor Company, Dearborn, Mich.

[21] Appl. No.: 851,002

[22] Filed: Nov. 14, 1977

[51] Int. Cl.² ........................................... F16H 47/00
[52] U.S. Cl. ......................................... 74/730; 74/645; 60/338; 64/27 F; 192/106.2
[58] Field of Search ............... 74/645 R, 730, DIG. 1; 192/106.2, 3.22; 64/27 F; 60/338, 347, 367

[56] References Cited

U.S. PATENT DOCUMENTS

| | | | |
|---|---|---|---|
| 2,042,570 | 6/1936 | Wemp | 192/106.2 |
| 2,318,620 | 5/1943 | Nutt | 192/106.2 |
| 2,687,627 | 8/1954 | Binder | 64/27 F |
| 3,252,352 | 5/1966 | General et al. | 74/645 |

Primary Examiner—Edgar W. Geoghegan

[57] ABSTRACT

A hydrokinetic unit for use with an automatic power transmission mechanism in an automotive vehicle driveline comprising a lock-up clutch for connecting directly the turbine and the impeller of the hydrokinetic unit to effect a fully mechanical, direct drive therethrough, the lock-up clutch being situated internally of the hydrokinetic unit and including a vibration cushion and damper that cushions clutch engagement and eliminates or reduces undesirable torque variations or pulses in the driveline when the clutch is engaged and during clutch engagement thereby improving the driveability of the vehicle.

6 Claims, 3 Drawing Figures

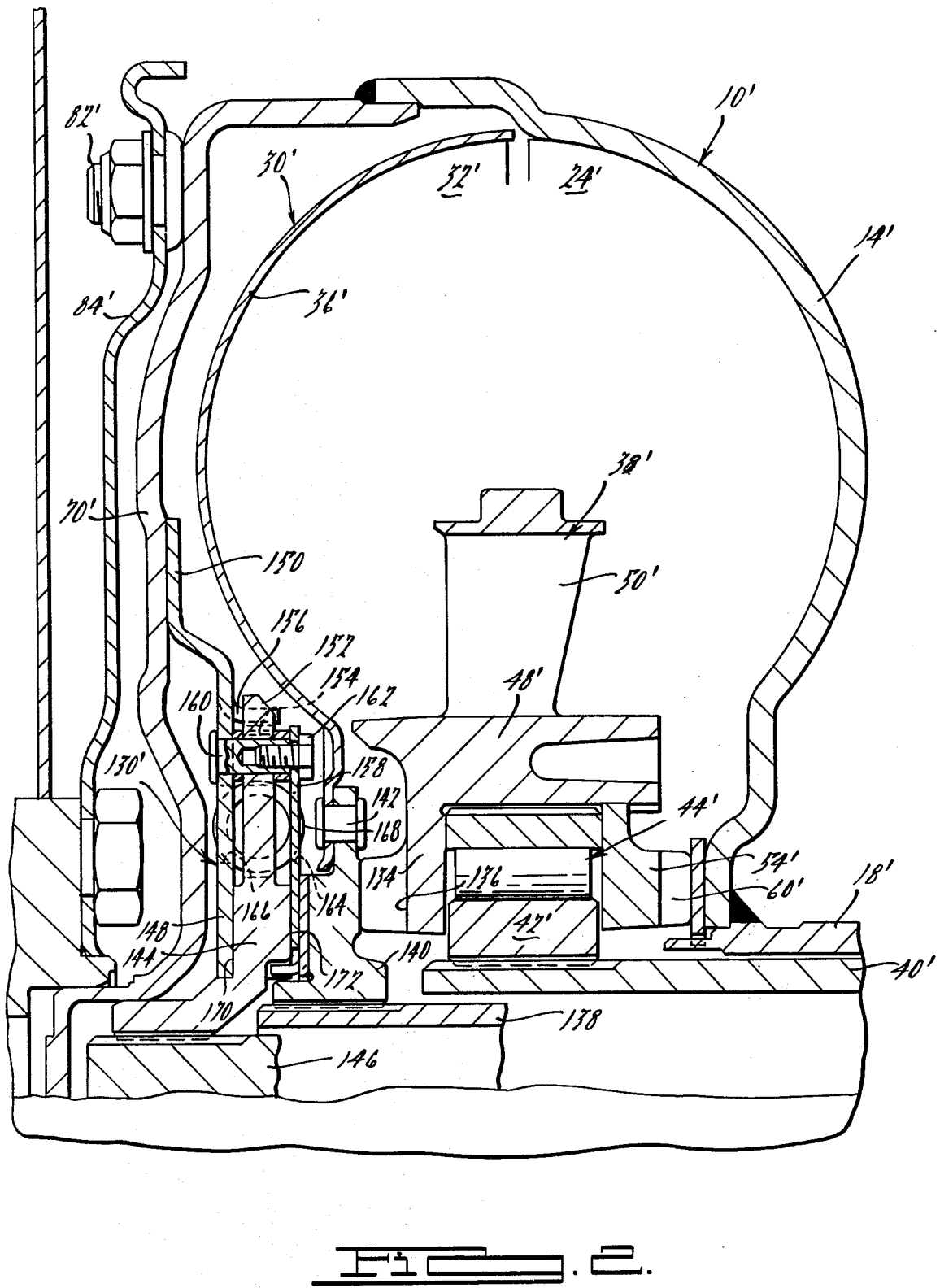

HYDROKINETIC TORQUE CONVERTER WITH LOCK-UP CLUTCH AND INTERNAL VIBRATION DAMPING

BRIEF DESCRIPTION OF THE INVENTION

My invention comprises improvements in a hydrokinetic unit such as the torque converter disclosed in U.S. Pat. No. 3,252,352. The hydrokinetic unit shown in that prior art patent includes a bladed turbine, a bladed impeller and a bladed stator arranged in a torus circuit that is enclosed within an impeller housing. The impeller is adapted to be connected to an internal combustion engine. The turbine is adapted to be connected to multiple ratio planetary gearing which provides plural torque delivery paths between the turbine and the power output shaft. The housing encloses a lock-up clutch adapted to connect the turbine to the impeller to effect a direct mechanical drive through the hydrokinetic unit with a 1:1 driving ratio. When the clutch is disengaged, the torque delivery path between the engine and the gearing is fully hydrokinetic.

Because the internal combustion engine is subject to slight torque variations during steady state driving as well as during deceleration of the vehicle at closed or part throttle, the torque fluctuations tend to be delivered through the engaged clutch to the output elements of the gear system, thereby preventing noticeable driveability problems. The improvements of my invention are designed to overcome this problem by isolating or eliminating torque fluctuations when the clutch is fully engaged. Such torque fluctuations do not present problems when the clutch is disengaged because they are absorbed by the hydrokinetic unit.

The improvements of my invention comprise a clutch structure located within the housing of the impeller of the hydrokinetic unit. The clutch structure includes a friction clutch disc that is adapted to be engaged by the static fluid pressure within the torus circuit and which forms in part the flow path for the fluid circulated to the hydrokinetic unit for cooling purposes. The clutch disc is adapted to engage and disengage a cooperating portion of the impeller housing in response to changes in pressure distribution in the torus circuit. The torque on the disc is adapted to be delivered to the clutch plate and a damper spring connection is provided between the disc and the clutch plate, the latter being connected to the turbine shaft. Slight angular rotation of the clutch disc with respect to the clutch plate occurs when torque fluctuations take place, and this angular adjustment is resisted by the springs. A normally engaged friction clutch damper is carried by the clutch disc and is adapted to apply an engaging force to the clutch plate, which establishes a frictional force component in a tangential direction whereby the vibrations that accompany the torque fluctuations may be absorbed and dissipated in the form of heat that is transferred to the cooling oil circulating through the hydrokinetic unit.

The damper spring assembly may be applied to an alternate transmission construction wherein the clutch is located externally in the hydrokinetic unit within the gear system. In a typical environment a damper spring unit may be used with an overdrive clutch which, when engaged, establishes a drive connection between the impeller and the output elements of the gearing. When the overdrive clutch is disengaged, the transmission system, including the hydrokinetic torque converter, is adapted to act in a conventional fashion and the damper feature is inactive.

Reference may be made to prior U.S. Pat. Nos. 2,687,627; 2,042,570 and 2,318,620 for examples of damper spring assemblies used in friction clutches in manual transmission drivelines.

BRIEF DESCRIPTION OF THE FIGURES OF THE DRAWINGS

FIG. 2 shows an alternate environment for the damper mechanism shown in the assembly of FIG. 1. That mechanism is adapted to be used with a gear system capable of providing three forward driving ratios and a fourth overdrive ratio.

PARTICULAR DESCRIPTION OF THE INVENTION

Figures 1, 3:
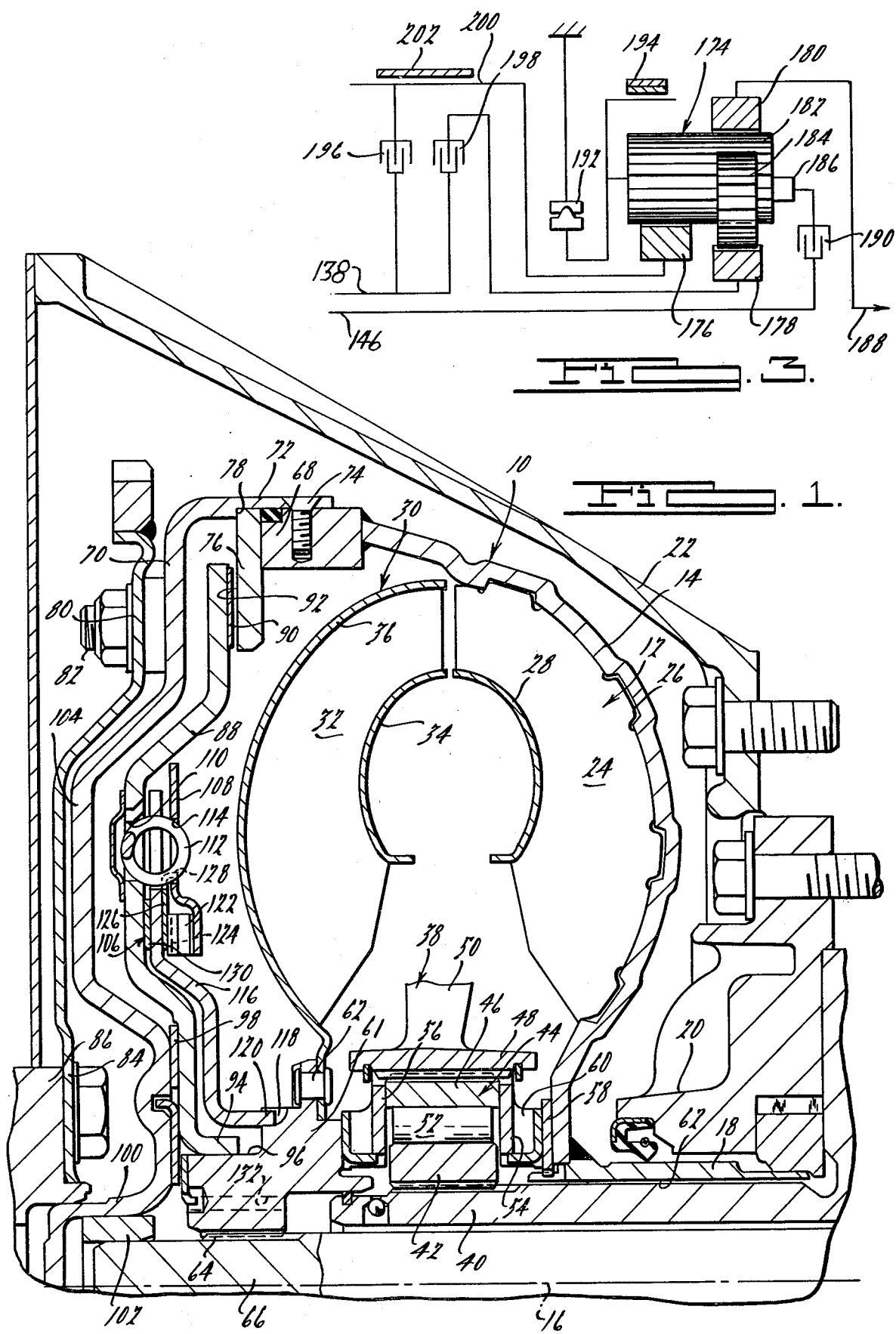
FIG. 1 shows in cross-sectional form a hydrokinetic torque converter assembly embodying the improvements of my invention.
FIG. 3 is a schematic representation of a gear system adapted to be used with the hydrokinetic torque converter of FIG. 2.

In FIG. 1 reference character 10 identifies a hydrokinetic torque converter which comprises an impeller 12 with an impeller housing 14 in the form of a semi-torus. The axis of rotation of the impeller is identified by reference character 16.

The hub of the impeller housing 14 is in the form of a sleeve 18 which is journalled in a central opening formed in bearing wall 20 of housing 22 of a transmission mechanism.

Impeller 12 includes blades 24 arranged for toroidal fluid flow in a generally outward radial direction. The blades are retained by retainer tabs 26 located in registering notches formed in the inner wall of the housing 14. An inner impeller shroud 28 cooperates with the baldes to define the radial outflow passages.

The hydrokinetic turbine is shown at 30. In includes turbine blades 32 arranged to define radial inflow passages. Inner shroud 34 and outer turbine shroud 36 cooperate with the other blades to define radial inflow passages. A bladed stator 38 is located at the radially inward region of the toroidal fluid flow circuit at a location intermediate the outlet side of the turbine blades and the inlet side of the impeller blades. The radial inflow passages of the turbine and the radial outflow passages of the impeller, together with the flow passages defined by the stator 38, define a toroidal fluid flow circuit through which torque may be transmitted from the impeller to the turbine.

A stator sleeve shaft 40 is connected to the bearing wall 20 and is held stationary by the transmission housing 22. An inner race 42 for an overrunning brake 44 is splined directly to the sleeve shaft 40. An outer race 46 for the overrunning brake 44 is secured by splines or by other attachment means to the hub 48 of the stator 38. The stator blades 50 are joined to the hub and extend in a generally radial direction within the torus circuit. Overrunning brake rollers 52 are arranged between the races 46 and 42 and are adapted to prevent rotation of the stator in one direction while permitting freewheeling motion in the opposite direction. Freewheeling motion occurs in the direction of rotation of the impeller.

Stator end thrust rings 54 and 56 are located on either side of the stator, thrust forces on the thrust ring 54 acting against the adjacent portion of the impeller hub through thrust washer 58. A series of radial ports 60 communicates with the interior of the circuit and with an annular passage 62 formed in the sleeve 18 to allow converter fluid to be distributed to the torus circuit.

The turbine 30 is provided with a turbine hub 60 to which the radially inward portion of the shroud 36 is secured, such as by rivets 62. The hub is splined at 64 to turbine shaft 66.

Turbine shaft 66 is adapted to be connected to the torque input elements of the gearing shown in FIG. 1.

The housing 14 carries a clutch reaction ring 68. An end wall 70 of the hydrokinetic unit has its margin 72 extending in an axial direction, and it overlies the reaction ring 68. The margin 72 can be connected to the reaction ring 68 by any suitable fastening means, such as rivets or screws 74 or by welding. A clutch friction plate 76 engages the reaction ring 68 on one side thereof and a reaction shoulder 78 in the periphery 72 on the other side thereof. A driveplate 80 is secured by suitable drive pins or studs 82 to a radially outward part of the end wall 70. Drive plate 80 is connected at its hub 84 to the crankshaft 86 of an internal combustion engine.

A clutch friction plate or disc 88 is located within the impeller housing at a location intermediate the turbine shroud 36 in the end wall 70. The outer periphery of the disc 88 is provided with a friction surface 90 which is situated directly adjacent friction surface 92 of the clutch element 76.

The friction disc 88 is formed with a hub 94 piloted on a cylindrical surface 96 of the turbine 61. It is adapted to slide axially on the surface 96. A thrust washer 98 is located between the hub 61 of the turbine and the hub 94 of the clutch disc 88. A central portion of the end wall 70 is formed with a pilot extension 100 within which is positioned pilot bearing 102 that receives the end of the turbine shaft 66.

The portion of the end wall 70 intermediate the central portion and its outer margin is extended in a generally axial direction toward the crankshaft of the engine as shown at 104. This permits space between the walls 70 and the shroud 36 for accommodating a torsional vibration dampening mechanism generally identified by reference character 106.

The mechanism 106 includes a spring cage or retainer plate 108 that is secured fast to the clutch friction disc 88 by suitable drive pins not shown. Clutch disc 88 is provided with a series of tangentially spaced openings 110, each opening receiving a compression spring 112. Similarly, plate 108 is formed with openings 114, each of which also registers with and receives a spring 112.

A torque delivery plate 116 is keyed or otherwise positively connected to the turbine hub 61. The hub may be slotted at 118 to receive five fingers or projections 120 at the radially inward margin of the plate 116.

The inner margin of the plate 108 carries a compression spring 122 which is of annular shape and which is provided with waves or undulations which carry a friction ring 124. Ring 124 engages a thrust ring 126 which is formed with a tang 128 engageable with a cooperating opening in the plate 108. A second thrust ring 130, which acts as a separator plate, is situated between clutch disc 88 and the plate 116. Spring 122 is effective to establish a friction force to ring 130 and ring 124. When disc 88 is displaced relative to plate 116, a tangential friction force is established by the friction plates 130 and 124, which tends to resist relative displacement. This establishes a dampening action which complements the cushioning action of the springs 112.

The damper creates a friction force and absorbs the energy of the dampening action and the resulting heat is absorbed by the fluid circulating through the torus circuit.

The annular space between the impeller hub sleeve 18 and the stator sleeve shaft 40 serves as a pressure supply passage for the torus circuit. When the clutch is disengaged, fluid is distributed through that annular space and through radial passages 60 to the torus circuit. Fluid then passes through the space between the friction surfaces 90 and 92 of the clutch and then radially inward through the annular space between the end wall 104 and the clutch disc 88. The turbine hub 61 is provided with an axial flow passage 132 which communicates with the fluid discharge circuit through the annular space located between the turbine shaft 66 and the stator sleeve shaft 40.

When the clutch is locked, pressure is distributed through the annular space between the sleeve shaft 40 and the turbine shaft 66 and through the passages 132 to the space located between the wall 104 and the clutch disc 88. The annular space between the impeller hub sleeve 18 and the stator sleeve shaft 40, which normally acts as the charge pressure passage, is exhausted or distributed to a low pressure part of the control system. In these circumstances the clutch becomes applied, thereby establishing a direct driving connection from the impeller to the turbine. The cushioning action of the springs 112 and the dampening action of the friction damper shown in part at 122, 124 and 130 cushions the clutch engagement and dampens the torsional vibrations resulting from clutch engagement and from torque fluctuations in the engine.

Many of the elements in the structure shown in FIG. 2 are common to those shown in FIG. 1. These common elements have been identified by similar reference characters although prime notations are added. They will not be described again, but reference may be made to the description of FIG. 1 for an understanding of the structure of FIG. 2.

The hub 48' of the reactor or stator 38' includes a thrust wall 134, which is formed with radial flow passages 136. Fluid supplied through the annular space between the impeller hub sleeve 18' and the stator sleeve shaft 40' is distributed through radial flow passages 60' and through the circuit.

Fluid is returned from the fluid torus circuit through passages 136 and then through the annular space located between the stator sleeve shaft 40' and turbine shaft 138.

Turbine hub 140 is splined to the shaft 138. It is secured to the outer shroud 36' of the turbine 30' by several fastening means such as rivets 142.

The damper assembly 130' of the construction shown in FIG. 2 includes a hub 144, which is connected to a centrally disposed torque delivery shaft 146 which extends through the turbine shaft 138.

A drive plate 148 of the damper assembly 130' is secured, preferably by spot welding, to the interior of the end wall 70' as shown at 150. The hub 144 directly engages the plate 148.

The hub 144 forms a part of a drive disc 152 which extends radially outwardly. The outer margin of the disc 152 is provided with drive slots 154 within which drive tangs 156 formed on the plate 148 are situated. A controlled amount of relative angular movement of the hub 144 relative to the plate 148 may take place because the slots 154 are narrower than the registering drive tangs 156.

A Belleville spring disc 158 is secured to the plate 148. This connection is accomplished by spacers 160 that extend through cooperating openings in the plate 148 and which are internally threaded to receive retainer bolts 162 which clamp the Belleville disc 158 securely against the end of the spacer 160 to form a rigid assembly for the disc 158 and the plate 148. The disc 158, as well as the plate 148, is provided with a series of tangentially spaced openings 164 and 166, respectively, which receive tangentially positioned compression springs 168. The disc 152 is formed with radially projecting fingers, one of which extends through each adjacent pair of springs 168 and which engages the springs to provide a resilient connection between the hub 144 and the impeller housing 14'. This construction may be understood more readily if reference is made to U.S. Pat. Nos. 2,687,627; 2,042,570 and 2,318,620 which show details of a spring and damper assembly.

The hub 144 of the spring and damper assembly 130' comprises a pair of annular friction surfaces 170 and 172. The former engages the plate 148 and the latter engages one surface of the Belleville disc 158. The disc 158 is preloaded so that a continuous spring force is exerted on the hub 144. This preload on the Belleville disc creates a normal friction force that engages the cooperating friction surfaces of the hub 114 and the plate 148 on one side of the assembly 130' and with the friction surface on the Belleville disc on the other side of the assembly 130'.

FIG. 3 shows a gear system that is adapted for use with the converter shown in FIG. 2. The gear system is generally identified by reference numeral 174. It includes a large sun gear 176, a small sun gear 178, a ring gear 180 and compound planetary pinions which include a series of long pinions 182 and short pinions 184. These pinions are mounted on a common carrier 186 and they mesh with each other. The long pinions 182 mesh with sun gear 176 and short pinions 184 mesh with sun gear 178. Pinions 182 mesh also with ring gear 180, which is connected to the power output shaft 188.

Shaft 146 is adapted to be connected to the carrier 186 through an overdrive clutch 190. Carrier 186 is braked by an overrunning brake 192 to provide torque reaction in one direction. Brake 192 permits freewheeling motion in the opposite direction. A friction brake 194 is arranged in parallel relationship with respect to the brake 192 and is adapted to accommodate reaction torque delivery to the housing in either direction.

The turbine shaft 138 is adapted to be connected to sun gear 176 through selectively engageable friction clutch 196. It is adapted to be connected to sun gear 178 through selectively engageable friction clutch 198. Brake drum 200, which is connected to the sun gear 176, is adapted to be braked selectively by brake band 202 to provide an intermediate speed ratio torque reaction.

Clutch 198 is applied during forward drive operation in each ratio. Either brake band 194 or overruning brake 192 serves as a reaction point during low speed ratio operations.

To establish intermediate speed ratio operation, brake band 202 is applied. Overruning brake 192 freewheels under these conditions and sun gear 176 acts as a reaction point.

To establish direct-drive, 1:1 operation, both clutches 198 and 196 are engaged simultaneously thereby locking up the gear system for rotation in unison. Brake band 202 is released. Brake 194 normally is not applied during forward drive operation although it may be applied if coast braking is desired when the transmission is operating in the lowest ratio. It is engaged also during reverse drive.

During reverse drive operation clutch 190 is released and clutch 196 is applied; and with the carrier acting as a reaction point with the brake band 194 applied, the ring gear 180 is driven in the reverse direction as the sun gear 176 acts as a power input element for the gear system.

If the clutch 190 is engaged during operation of the transmission in direct drive operation, a portion of the torque is delivered mechanically from the impeller to the output shaft; and the balance is distributed hydrokinetically from the turbine and through the lock-up gear system to the output shaft.

During overdrive operation the clutch 190 is engaged, and the carrier is locked by engaging the brake band 194. Both clutches 196 and 198 are released as is the brake band 202. As in the case of the structure shown in FIG. 1, engagement of the overdrive clutch is dampened by the damper assembly and the springs associated with that damper assembly provide a cushioning action.

Having thus described preferred forms of my invention, what I claim and desire to secure by U.S. Letters Patent is:

1. A hydrokinetic torque transmitting mechanism comprising a bladed impeller and a bladed turbine situated in toroidal fluid flow relationship, the impeller being adapted to be connected to a source of torque such as an internal combustion engine, multiple ratio gearing, an output element of said gearing being connected to driven portions of said mechanism, a torque input element of said gearing being adapted to be connected to said turbine, a mechanical torque delivery path arranged in parallel disposition with respect to the hydrokinetic torque delivery path defined by said impeller and said turbine including a friction clutch selectively engageable to establish and disestablish said mechanical torque delivery path, said torque delivery path being defined in part by a vibration cushioning and dampening mechanism having a torque input element and a torque output element, a spring connection between said torque input element and said torque output element, said torque input element and said torque output element being adapted for limited relative angular displacement therebetween, said spring connection resisting said relative displacement, a damper spring carried by one of said elements of said cushioning and dampening mechanism, friction surfaces carried by said torque input and torque output elements and arranged in juxtaposed face-to-face relationship, said damper spring being adapted to apply an engaging force to said friction surfaces thereby establishing tangential damping forces upon relative displacement of said torque input element and said torque output element.

2. The combination as set forth in claim 1 wherein said damper spring comprises a Belleville disc carried by said input element and including a portion overlying the friction surface carried by said torque output element, whereby a continuous spring preload is applied to said juxtaposed friction surfaces thereby establishing a damping action upon engagement of said clutch.

3. The combination as set forth in claim 1 wherein said damper spring comprises a plate carried by said torque input element, an annular spring carried by said plate, said spring having axially displaced portions engageable with said juxtaposed friction surfaces to establish a preload thereon thus establishing damping action upon engagement of said clutch.

4. The combination as set forth in claim 1 including a common impeller housing enclosing said impeller and said turbine, said cushioning and dampening mechanism being located adjacent said turbine in said housing and means for circulating fluid through said torus circuit and through said housing thereby permitting dissipation of the energy absorbed by said spring and damper assembly in the form of heat.

5. The combination as set forth in claim 2 including a common impeller housing enclosing said impeller and said turbine, said cushioning and dampening mechanism being located adjacent said turbine in said housing and means for circulating fluid through said torus circuit and through said housing thereby permitting dissipation of the energy absorbed by said spring and damper assembly in the form of heat.

6. The combination as set forth in claim 3 including a common impeller housing enclosing said impeller and said turbine, said cushioning and dampening mechanism being located adjacent said turbine in said housing and means for circulating fluid through said torus circuit and through said housing thereby permitting dissipation of the energy absorbed by said spring and damper assembly in the form of heat.

* * * * *